(12) United States Patent
Liu et al.

(10) Patent No.: US 8,799,632 B2
(45) Date of Patent: Aug. 5, 2014

(54) METHOD AND DEVICE FOR RESETTING A SYSTEM TO FACTORY DEFAULT SETTINGS

(75) Inventors: Chun-Hung Liu, Hsinchu (TW); Tsung-Hau Shiu, Hsinchu (TW); Kuo-Chih Ho, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 290 days.

(21) Appl. No.: 13/414,650

(22) Filed: Mar. 7, 2012

(65) Prior Publication Data

US 2012/0260076 A1      Oct. 11, 2012

(30) Foreign Application Priority Data

Apr. 11, 2011   (TW) .............................. 100112415 A

(51) Int. Cl.
*G06F 9/00* (2006.01)
*G06F 15/177* (2006.01)
*G06F 11/00* (2006.01)
*H04L 12/28* (2006.01)

(52) U.S. Cl.
CPC .................................. *H04L 12/2827* (2013.01)
USPC ................... 713/1; 713/2; 713/100; 709/220; 714/23; 714/36

(58) Field of Classification Search
CPC ............................. G06F 1/24; H04L 12/2827
USPC ............... 713/1, 2, 100; 709/220; 714/23, 36
See application file for complete search history.

(56) References Cited

U.S. PATENT DOCUMENTS

| | | | |
|---|---|---|---|
| 8,447,845 B1 * | 5/2013 | Scott et al. | 709/220 |
| 8,483,987 B2 * | 7/2013 | Terao | 702/117 |
| 2004/0034872 A1 * | 2/2004 | Huyge et al. | 725/111 |
| 2009/0031122 A1 * | 1/2009 | Hodzic et al. | 713/1 |
| 2010/0091686 A1 * | 4/2010 | Rutjes et al. | 370/254 |
| 2013/0177054 A1 * | 7/2013 | Cooper et al. | 375/222 |
| 2013/0219031 A1 * | 8/2013 | Schulz et al. | 709/221 |

FOREIGN PATENT DOCUMENTS

| | | |
|---|---|---|
| TW | 339423 | 9/1998 |
| TW | 200608799 | 3/2006 |

* cited by examiner

*Primary Examiner* — Stefan Stoynov

(57) ABSTRACT

A method for resetting a system to factory default settings is provided. The method includes: disconnecting-connecting a power source repeatedly; detecting whether a count value of disconnecting-connecting the power source has exceeded a predetermined value; and triggering a procedure of resetting the system to factory default settings when the count value has exceeded the predetermined value.

9 Claims, 4 Drawing Sheets

US 8,799,632 B2

METHOD AND DEVICE FOR RESETTING A SYSTEM TO FACTORY DEFAULT SETTINGS

CROSS REFERENCE TO RELATED APPLICATIONS

This application claims priority of Taiwan Patent Application No. 100112415 filed on Apr. 11, 2011, the entirety of which is incorporated by reference herein.

BACKGROUND OF THE INVENTION

1. Field of the Invention

The present invention relates to a method and a device for resetting a system to factory default settings, and in particular relates to a method and a device for resetting an embedded system to factory default settings.

2. Description of the Related Art

For years, Ethernet cables have primarily been used in digital home wiring for the transmission of audio-video signals and digital data among rooms in a house and for connections among equipment, such as multimedia systems, automatic control systems, and security systems, etc.

However, Ethernet infrastructure has a disadvantage in that, when wiring an existing building structure, users need to understand the usage about jumper wirings, the wirings hidden in the walls, twisted wires, coaxial wires, concentrators, converters and so on. For most people, the technique of the Ethernet infrastructure is more difficult to understand.

Moreover, most people do not consider the need for Ethernet infrastructure when designing and constructing a building structure and do not reserve space for constructing Ethernet infrastructure. If a user wants to construct the Ethernet infrastructure, the user must install Ethernet cables along the walls instead of damaging the building structure. However, the Ethernet cables are conspicuous and not beautiful. Therefore, there is a need to construct and use a local area network simply.

Therefore, new technologies, Multimedia over Coax Alliance (MoCA) specifications, have been developed to overcome the aforesaid disadvantages of Ethernet cables. Instead of installing a new wiring network system, the MoCA specifications utilize transmission lines commonly found in existing building structures for digital signal transmission. In particular, the MoCA specifications require use of coaxial cable lines. According to the MoCA specifications, by coupling an MoCA-compliant multiplexer or adaptor to a coaxial cable, the coaxial cable can be used for telephone service and computer digital network applications and can provide sufficient bandwidth to satisfy remote control of audio-video data streams.

In general, coaxial cables and power inserters are installed inside of the house, and all devices in an MoCA network are linked and communicated to a router installed outside of the house through the coaxial cables and the power inserters. To reset the router to factory defaults, the user has to go outside and restart the router installed at the outside of the house. Therefore, there is a need for a mechanism to reset a network system to the factory default status without having to go to the outside or using any additional hardware interface, button, or switch, wherein the user may be inside the house and use the mechanism to restart the router installed at the outside of the house.

BRIEF SUMMARY OF THE INVENTION

Accordingly, methods and devices for resetting to factory defaults, and computer program products thereof are provided.

An embodiment of a method for resetting a system to factory default settings, comprises: disconnecting-connecting the power source repeatedly; detecting whether a count value of disconnecting-connecting the power source has exceeded a predetermined value; and triggering a procedure of resetting the system to factory default settings when the count value has exceeded the predetermined value.

An embodiment of a device for resetting a system to factory default settings, wherein the system is connected to a power source, comprises: a detection unit, configured to detect an action of disconnecting-connecting the system to the power source and keep count of a count value of disconnecting-connecting the system to the power source; and a decision unit, configured to trigger the resetting of the system to factory default settings when the count value has exceeded a predetermined value.

Methods for node distribution may take the form of a program code embodied in a tangible media. When the program code is loaded into and executed by a machine, the machine becomes an apparatus for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
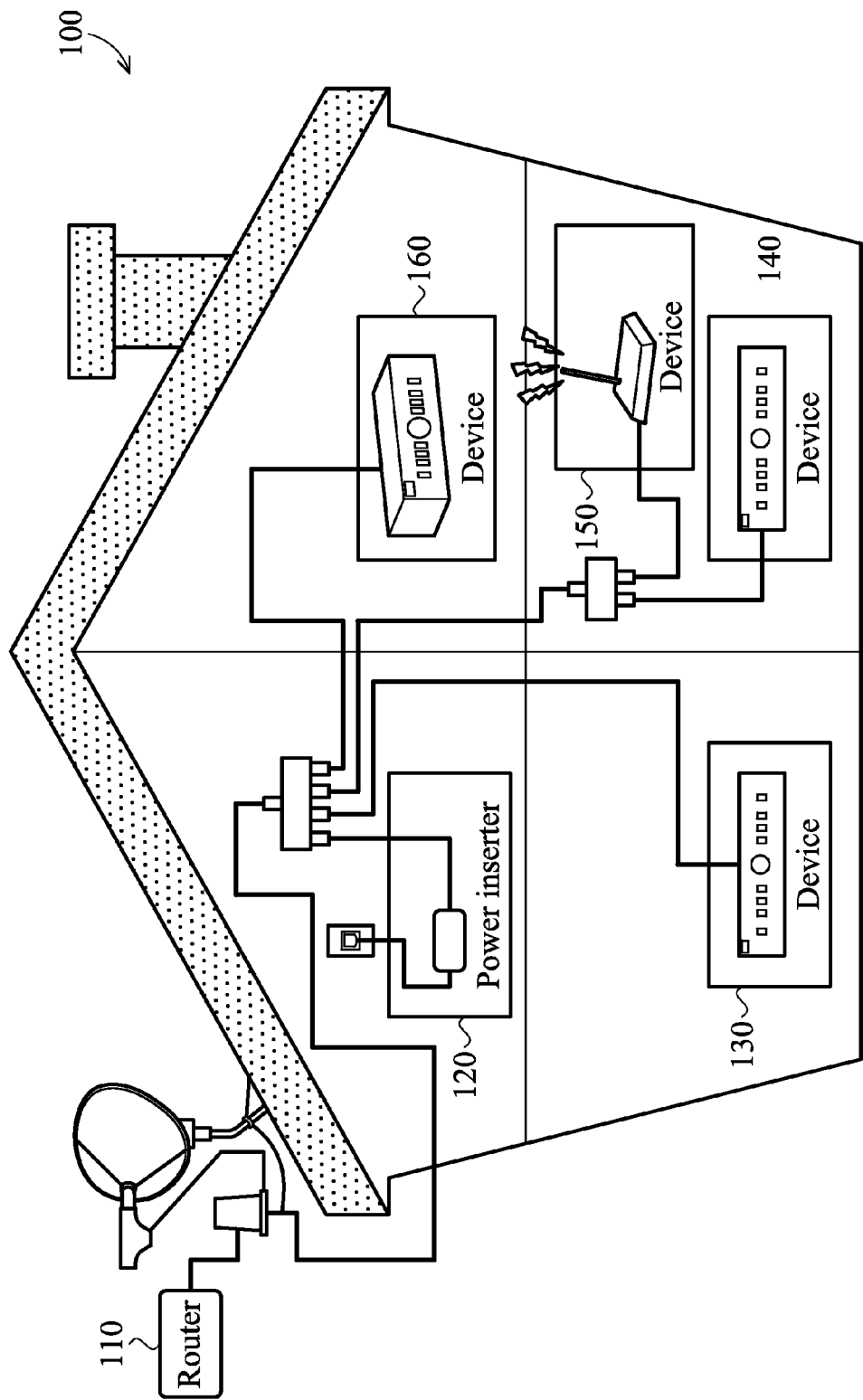
FIG. 1 is a schematic drawing of an MoCA system according to an embodiment of the invention.

FIG. 1 is a schematic drawing of an MoCA system according to an embodiment of the invention. In FIG. 1, the MoCA system 100 is constructed according to the Multimedia over Coax Alliance (MoCA), and comprises a plurality of high-definition devices 130~160, a power inserter 120 and a router 110. The plurality of high-definition devices 130~160 and the power inserter 120 are directly interconnected via a coaxial cable, including the router installed outside of the house, wherein the high-definition devices 130~160 may be high definition set-top-boxes (HD STB), high definition digital video broadcasting (HD DVB) devices or wireless fidelity (WIFI) devices and so on. The power inserter 120 controls the supply of power from a power source. In general, the coaxial cable, the power inserter 120 and the device 130~160 are installed in the house, the router 110 is linked and communicated with the power inserter 120 and the device 130~160 via the coaxial cable. To reset the MoCA system 100 to factory default settings, the method in the invention is applied to the router 110. The user can reset the MoCA system 100 to factory default settings by disconnecting-connecting the power source through the power inserter 120 to restart the router 110.

Figure 2:
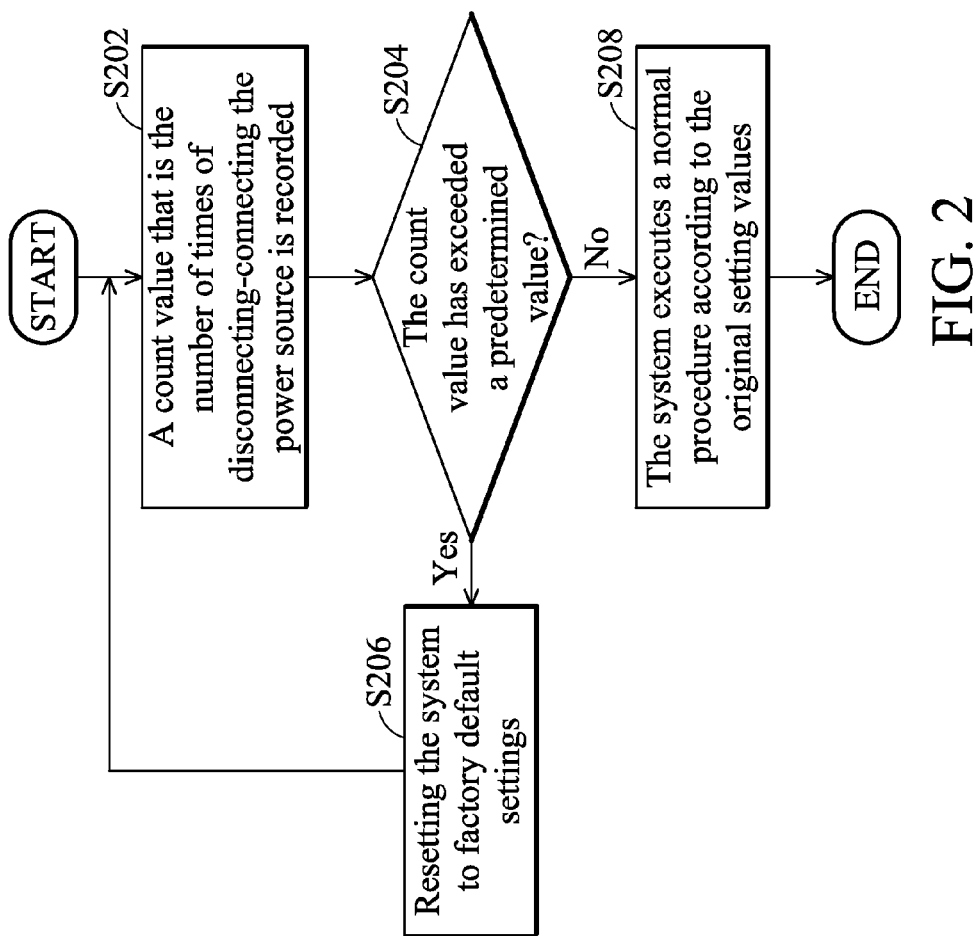
FIG. 2 is a diagram illustrating a flowchart of a method for resetting to factory default settings according to an embodiment of the invention.

FIG. 2 is a diagram illustrating a flowchart of a method for resetting to factory default settings according to an embodiment of the invention. First of all, in step S202, the power source of the MoCA system 100 is disconnecting-connecting repeatedly, and a count value that is the number of times of disconnecting-connecting the power source is recorded. In step S204, whether the count value has exceeded a predetermined value is detected. When the count value has exceeded a predetermined value ("Yes" in step S204), the router 110 is triggered to execute the procedure of resetting the MoCA system 100 to factory default settings in step S206. When the count value has not exceeded the predetermined value ("No" in step S204), the system resets the count value to zero and executes a normal procedure according to the original setting values in step S208. In this embodiment, the actions of disconnecting and connecting the power source repeatedly in the MoCA system 100 to trigger the router to reset the MoCA system to factory default settings may be achieved by unplugging-plugging an electrical plug from an electrical outlet repeatedly.

In some embodiments, an embedded system may be used in the router in the MoCA system. When the MoCA system is reconnected to the power source, the embedded system used in the router starts to execute the bootloader in the embedded system and load the operation system kernel (Linux Kernel). One of the characteristics of this invention is that the operation time of disconnecting-connecting the power source repeatedly until the count value has exceeded the predetermined value must be smaller than the boot time for the embedded system to execute the bootloader and load the operation system kernel (Linux Kernel).

Figure 3:
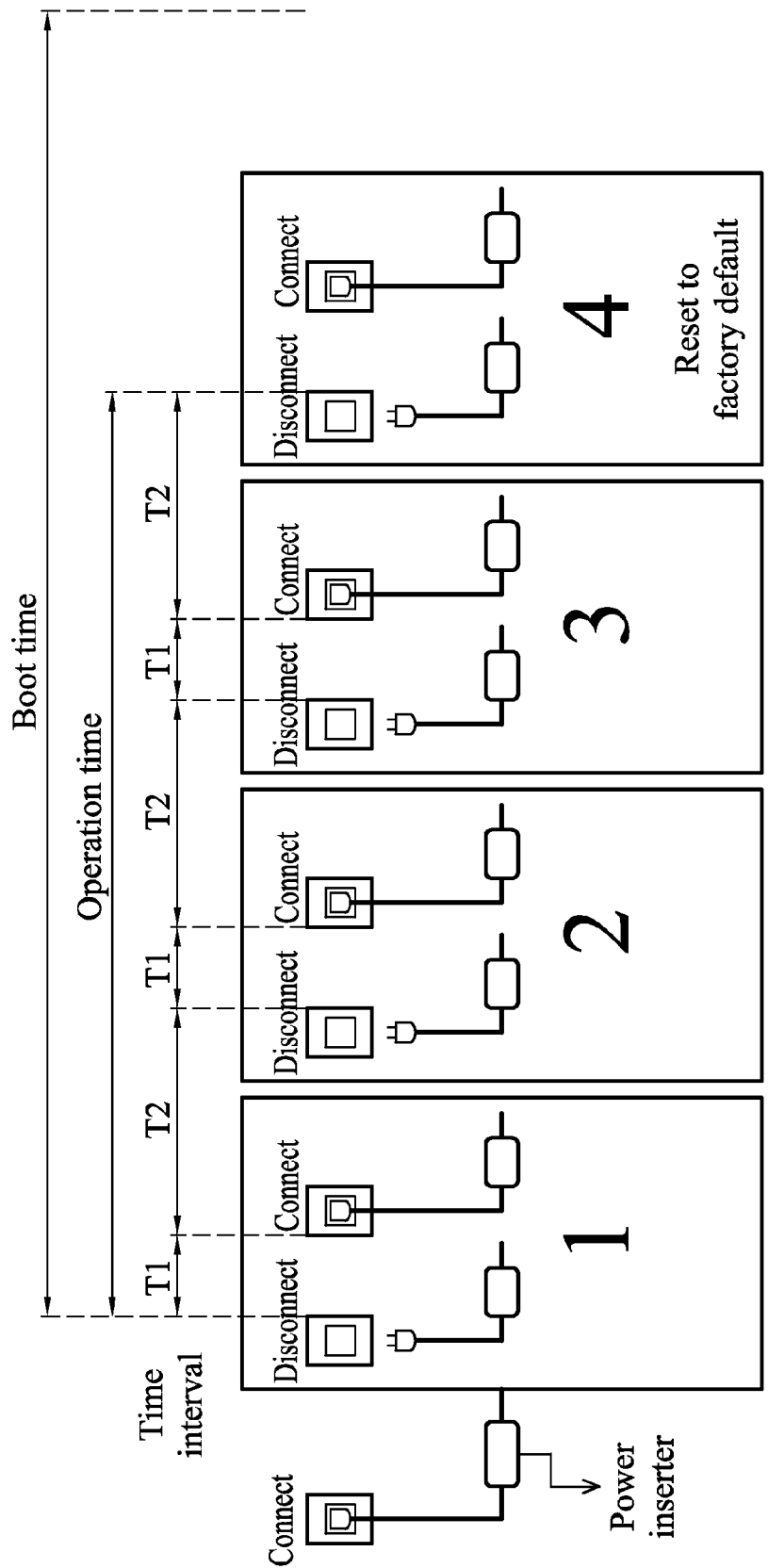
FIG. 3 is a schematic drawing of disconnecting-connecting to the power source repeatedly according to an embodiment of the invention.

For example, in an embedded Linux system, the time of loading the bootloader is about 17 seconds, the time of loading the operation system kernel (Linux Kernel) is about 23 seconds, and the boot time that is the summation of the time of loading the bootloader and the time of loading the operation system kernel (Linux Kernel) is about 40 seconds. When the count value of disconnecting-connecting the power source has exceeded a predetermined value of 40 seconds, the router is triggered to reset the system to the factory default settings. When the count value of disconnecting-connecting the power source has not exceeded the predetermined value of 40 seconds, the embedded Linux system executes the boot sequence and the router is not triggered to be reset to factory default settings. FIG. 3 is a schematic drawing of disconnecting-connecting with the power source repeatedly according to an embodiment of the invention. The time interval for disconnecting-connecting the power source is T1, and the time interval for connecting-disconnecting the power source is T2. In this embodiment, the predetermined value is 3 times. When the operation time of disconnecting-connecting the power source repeatedly is within the boot time and the count value of disconnecting-connecting the power source exceeds the predetermined value (3 times), the router is triggered to reset the system to factory default settings. When the operation time of disconnecting-connecting the power source repeatedly is within the boot time and the count value of disconnecting-connecting the power source has not exceeded the predetermined value (3 times), the system executes the boot sequence and the router is not triggered to reset the system to factory default settings. In another embodiment, the action of disconnecting-connecting the power source may be replaced with the action of unplugging-plugging an electrical plug from an electrical outlet.

It is noted that, the procedure of resetting the system to the factory default status is executed at the end of the stage of the operation system kernel to reduce the possibility that the procedure of resetting the system to the factory default status and power failure occur at the same time. If the procedure of resetting the system to the factory default status is executed at the beginning of the stage of the operation system kernel, the power failure and the procedure of detecting the count value may occur at the same time easily. However, one of ordinary skill in the art can understand that the embedded Linux system, the boot sequence, and the operation system kernel are not limited in the present invention.

Figure 4:
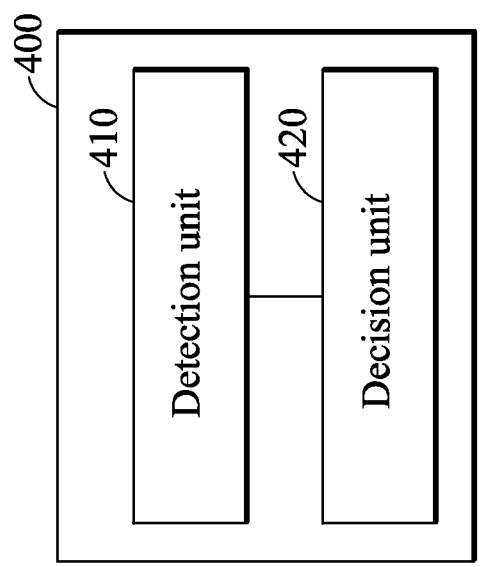
FIG. 4 is a block diagram illustrating a device 400 executing a method for resetting a system to factory default settings according to an embodiment of the invention.

FIG. 4 is a block diagram illustrating a device 400 executing a method for resetting a system to factory default settings according to an embodiment of the invention. The device 400 may be installed in the router 110 in FIG. 1, wherein the device 400 includes a detection unit 410 and a decision unit 420. The detection unit 410 is configured to detect the action of disconnecting-connecting the power source of the system and keep count of a count value that is the number of times of disconnecting-connecting the power source. The decision unit 420 coupled to the detection unit 410 is configured to detect whether the count value has exceeded the predetermined value. When the count value has exceeded the predetermined value, the decision unit 420 triggers the router to reset to the system to the factory default settings.

According the method and device in this invention, when the router is installed outside of the house or the system is needed to be reset to factory default settings because of other problems, the user in the house can use this mechanism to reset the system to the factory default settings.

Methods for resetting a system to factory default settings, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for resetting a system to a factory default setting, comprising:
   disconnecting-connecting a power source repeatedly;
   detecting whether a count value of disconnecting-connecting the power source has exceeded a predetermined value; and
   triggering a procedure of resetting the system to a factory default setting when the count value has exceeded the predetermined value, wherein the system comprises an embedded system, and when the system is connected to the power source, a bootloader and an operation system kernel are executed and loaded by the embedded system, wherein a time for disconnecting-connecting the power source until the count value of disconnecting-connecting the power source has exceeded the predetermined value must be smaller than a time for the embedded system to execute the bootloader and load the operation system kernel in order for the procedure of resetting the system to a factory default setting to be triggered.

2. The method for resetting a system to a factory default setting as claimed in claim 1, further comprising:

executing a normal procedure according to an original setting when the count value has not exceeded the predetermined value within the time for the embedded system to execute the bootloader and load the operation system kernel.

3. The method for resetting a system to a factory default setting as claimed in claim 1, wherein the action of disconnecting-connecting the power source is the action of unplugging-plugging an electrical plug from an electrical outlet.

4. A device for resetting a system to a factory default setting, wherein the system is connected to a power source, the device comprising:

a detection unit, configured to detect an action of disconnecting-connecting the system to the power source and keep count of a count value of disconnecting-connecting the system to the power source; and a decision unit, configured to trigger the resetting of the system to a factory default setting when the count value has exceeded a predetermined value, wherein the system comprises an embedded system, and when the system is connected to the power source, a bootloader and an operation system kernel are executed and loaded by the embedded system, wherein a time for disconnecting-connecting the power source until the count value of disconnecting-connecting the power source has exceeded the predetermined value must be smaller than a time for the embedded system to execute the bootloader and load the operation system kernel in order for the procedure of resetting the system to a factory default setting to be triggered.

5. The device for resetting a system to a factory default setting as claimed in claim 4, wherein when the count value counted by the detection unit has not exceeded the predetermined value within the time for the embedded system to execute the bootloader and load the operation system kernel, the system executes a normal procedure according to an original setting.

6. The device for resetting a system to a factory default setting as claimed in claim 4, wherein the action of disconnecting-connecting the power source is the action of unplugging-plugging an electrical plug from an electrical outlet.

7. A non-transitory machine-readable storage medium comprising a computer program, which, when executed, causes a system to perform a method for resetting the system to a factory default setting, wherein the system is connected to a power source, and the method comprises:

disconnecting-connecting the power source repeatedly;

detecting whether a count value of disconnecting-connecting the power source has exceeded a predetermined value; and triggering a procedure of resetting the system to a factory default setting when the count value has exceeded the predetermined value, wherein the system comprises an embedded system, and when the system is connected to the power source, a bootloader and an operation system kernel are executed and loaded by the embedded system, wherein a time for disconnecting-connecting the power source until the count value of disconnecting-connecting the power source has exceeded the predetermined value must be smaller than a time for the embedded system to execute the bootloader and load the operation system kernel in order for the procedure of resetting the system to a factory default setting to be triggered.

8. The non-transitory machine-readable storage medium as claimed in claim 7, the method further comprising:

executing a normal procedure according to an original setting when the count value has not exceeded the predetermined value within the time for the embedded system to execute the bootloader and load the operation system kernel.

9. The non-transitory machine-readable storage medium as claimed in claim 7, wherein the action of disconnecting-connecting the power source is the action of unplugging-plugging an electrical plug from an electrical outlet.

* * * * *